(12) United States Patent
Lovelace et al.

(10) Patent No.: US 6,263,431 B1
(45) Date of Patent: Jul. 17, 2001

(54) OPERATING SYSTEM BOOTSTRAP SECURITY MECHANISM

(75) Inventors: John V. Lovelace, Hillsboro; Bryon S. Nevis, Portland, both of OR (US)

(73) Assignee: Intle Corporation, Santa Clara, CA (US)

( * ) Notice: Subject to any disclaimer, the term of this patent is extended or adjusted under 35 U.S.C. 154(b) by 0 days.

(21) Appl. No.: 09/224,413

(22) Filed: Dec. 31, 1998

(51) Int. Cl.$^7$ ..................................................... G06F 9/445
(52) U.S. Cl. ................................................. 713/2; 713/200
(58) Field of Search ........................ 713/1, 2, 155–157, 713/175, 176, 200, 201

(56) References Cited

U.S. PATENT DOCUMENTS

| | | | |
|---|---|---|---|
| 5,638,446 | * 6/1997 | Rubin | 705/51 |
| 5,903,651 | * 5/1999 | Kocher | 713/158 |
| 5,919,257 | * 7/1999 | Trostle | 713/200 |

\* cited by examiner

*Primary Examiner*—Thomas M. Heckler
(74) *Attorney, Agent, or Firm*—Mark Seeley

(57) ABSTRACT

A method and apparatus for booting an operating system having at least one boot component comprising the steps of accessing an ordered list identifying the at least one boot component; accessing each of the at least one boot component using the ordered list; computing a first hash value from the at least one boot component; accessing a second hash value, the second hash value being secure; comparing the first hash value to the second hash value; and booting the operating system if the first hash value matches the second hash value.

10 Claims, 3 Drawing Sheets

OPERATING SYSTEM BOOTSTRAP SECURITY MECHANISM

BACKGROUND OF THE INVENTION

1. Field of the Invention

The present invention relates to the field of operating systems; more particularly, the present invention relates to a method and apparatus for operating system bootstrap security.

2. Description of Related Art

Computers systems are used for numerous purposes. Some of these purposes include the storage and retrieval of confidential information. Others, such as internet commerce, involve monetary transactions. Some mission critical applications must be consistently and accurately operating on a continuous basis.

Computer systems often include hardware and software security mechanisms to prevent unauthorized access to programs and information. For example, passwords may be used to limit access. However, computer systems are often susceptible to malicious programs that circumvent the security mechanisms to perform malicious acts such as corrupting programs and information or allowing unauthorized access to confidential information. In the past, these viruses typically gained initial access to a computer system via a corrupted program stored on a diskette. Now, the viruses are often embedded in programs or data downloaded through the internet.

As more business is transacted by computers connected to the internet, the potential losses due to an insecure computer system become larger. Thus, it is desirable to provide a more secure computer system.

One type of virus that gains access to computer systems is a boot virus. Typically, a boot virus will modify or replace certain startup modules (boot components), such as the master boot record, to gain control as the system firmware attempts to invoke an operating system. What is needed is a method and apparatus to prevent unauthorized modification or replacement of startup modules.

The startup modules may also be corrupted due to computer system malfunctions. Such corruption may cause the operating system to boot up incorrectly. This may cause programs and information to be corrupted or may leave the computer system in an insecure state. What is needed is a method and apparatus to prevent the booting of an operating system using corrupted startup modules.

SUMMARY OF THE INVENTION

A method and apparatus for booting an operating system having at least one boot component comprising the steps of accessing an ordered list identifying the at least one boot component; accessing each of the at least one boot component using the ordered list; computing a first hash value from the at least one boot component; accessing a second hash value, the second hash value being secure; comparing the first hash value to the second hash value; and booting the operating system if the first hash value matches the second hash value.

DETAILED DESCRIPTION

The method and apparatus of the present invention provides the ability to verify the integrity of the boot components in an operating system prior to using the boot components to boot a computer. In one embodiment, the method and apparatus prevents the unauthorized modification of a boot component, such as the insertion of a boot virus. In another embodiment, the method and apparatus of the present invention detects corrupted boot components.

In the following detailed description, numerous specific details are set forth in order to provide a thorough understanding of the described invention. Some of these specific details need not be used to practice the invention. In other instances, well-known structures, signals, and methods have not been shown in detail in order not to obscure the described invention. Furthermore, industry standards, such as digital signature standards, are discussed. It will be apparent that the invention is not limited to a particular method described with reference to an industry standard.

In the description herein, reference is made to encryption using public and private keys. These keys are generally based on some function of one or more large prime numbers. A private key is used to encrypt information (a message) which may be decrypted using a corresponding public key. Furthermore, private keys may be used to generate a digital signature on a message. A person can sign a message using a private key such that another person can use the corresponding public key to verify the authenticity and integrity of the original message. For example, Alice may have a private key which she keeps to herself and a public key which she shares with others. Alice can sign a message using her private key and distribute the signed message. Recipients can verify the signed message using Alice's public key. A successful verification indicates that the message had not been altered since being signed by Alice. One well-known method of encryption using private keys, public keys, and signatures is published by Rivest, Shamir, and Adleman (RSA) Laboratories. Other methods may be used to encrypt, decrypt, and sign messages.

Figure 1:
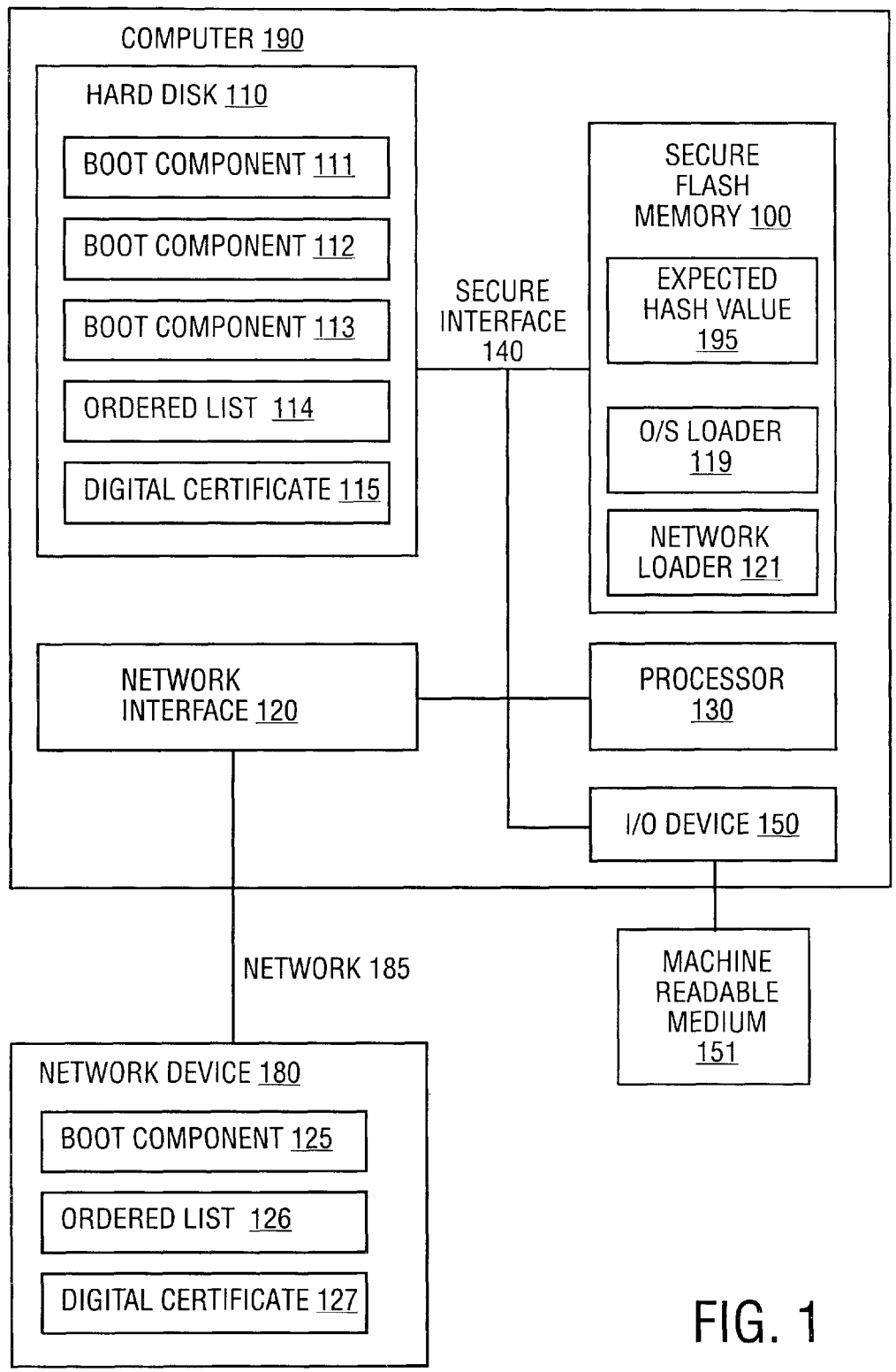
FIG. 1 illustrates a computer system configured to provide a secure boot operation.

FIG. 1 illustrates a computer system configured to provide a secure boot operation.

A computer 190 includes a hard disk 110, a network interface 120, a secure flash memory 100, a processor 130, and an input/output (I/O) device 150 coupled together by a secure interface 140.

The hard disk 110 includes a boot component 111, a boot component 112, a boot component 113, an ordered list 114, and a digital certificate 115. The boot components are software modules that are used to boot an operating system. For example, one boot component may be the master boot record (MBR). Another boot component may be responsible for computer security. It will be apparent to one skilled in the art that the invention may be practiced with any number of boot components.

The ordered list 114 is a list of the boot components in the order in which the boot components are supplied to a hash function to compute a hash value for the boot components. In one embodiment, the ordered list 114 is predetermined and embedded in the operating system. Alternatively, the ordered list 114 is dynamically generated.

The digital certificate 115 authenticates a message that includes an expected hash value of the boot components.

A hash function can be used to generate a condensed representation of a message. The hash function is selected such that the likelihood that two messages will generate the same hash value is small. Thus, if any change is made to the message supplied to the hash function, the condensed representation is expected to be different. By checking the hash value computed from the boot components of an operating system installed on the computer 190 with the expected hash value 195 computed with the production boot components by the operating system vendor, the integrity of the boot components can be assured. One well-known method of performing a hash function is published by the National Institute of Standards and Technology (NIST). Other methods of performing a hash function may be used.

In one embodiment, the location of the boot components is not part of the data provided to the hash function to generate the hash values. Thus, the hash values will be independent of the location of the boot components. This is important because the boot components may be located in numerous locations depending on the computer system configuration. In addition, the location of the boot components may change over time. For example, the boot components stored on the hard disk 110 may be relocated during a defragmentation operation. A defragmentation operation is performed to improve performance by organizing the location of files on the hard disk 110.

Alternatively, the location of the boot components is part of the data provided to the hash function to generate the hash values. When boot components are relocated, the expected hash value 195 is recomputed and signed using a private key. Using well known techniques, a private key may be obscured to prevent unauthorized use.

The expected hash value 195 is secured against modification by being stored in a digital certificate 115. The digital certificate 115 is signed by a trusted authority. For example, the digital certificate 115 may be signed by an operating system vendor or hardware vendor. In another embodiment, the trusted authority may be a company in the business of performing certifications. The expected hash value 195 is computed from the boot components provided in the order described in the ordered list 114.

In one embodiment, the trusted authority may be delegated through a digital certificate chain. For example, a Microsoft operating system signature may be used to delegate authority to a Microsoft Windows NT operating system certificate. A Microsoft Windows NT signature may be used to delegate authority to a Microsoft Windows NT version 4 certificate. The Windows NT version 4 signature may be used to secure the message, such as the expected hash value. The delegation hierarchy allows the number of certificate authorities that reside in firmware to be reduced while maintaining unique associations with each operating system. In one embodiment, the firmware only stores the Microsoft operating system signature. A standard provides compatibility across multiple computer platforms to which the certificate may be sent. One well-known standard is Recomendation X.509 published by the International Telecommunications Union (ITU). Other formats may be used.

In one embodiment, the digital certificate 115 is verified using the trusted authority signature. The message in the digital certificate 115 includes the expected hash value 195. The expected hash value 195 is transferred using the secure interface 140 and stored in the secure flash memory 100.

In one embodiment, the secure interface 140 and the secure flash memory 100 is secured using cryptographic techniques. In one embodiment, the secure flash memory 100 contains the basic input output system (BIOS) code that includes the O/S loader 119. In one embodiment, the secure flash memory 100 is secured using a digital signature. For example, the contents of the secure flash memory 100 may be digitally signed using a BIOS manufacturer signature. Before being used, the BIOS is verified using the BIOS manufacturer's public key. Once verified, the BIOS can be trusted to update the expected hash value 195.

The secure flash memory 100 includes the expected hash value 195, an operating system (O/S) loader 119, and a network loader 121. The O/S loader 119 is a software module that performs the verification of the boot components loaded from local media such as a hard disk and boots the operating system according to the methods described herein. The network loader 121 is a software module that performs the verification of the boot components loaded from a network device 180 through a network 185 that interfaces with the network interface 120 and boots the operating system according to the methods described herein. In another embodiment, a loader may load some boot components from a hard disk, other boot components from a network device, and still other boot components from other data sources.

In one embodiment, a boot component 125 is loaded from a network device 180 through a network 185 using the network interface 120. The network loader 121 uses a network protocol to identify the location of the boot component 125. Some or all of the boot components may be loaded from network devices.

In another embodiment, an ordered list 126 is loaded from the network device 180. The ordered list 126 is a list of the boot components in the order in which the boot components are supplied to a hash function to compute a hash value. In another embodiment, the O/S loader 119 is configured to load a predetermined set of boot components without reference to the ordered list 126 or the ordered list 114. In one embodiment, the O/S loader 119 is capable of loading boot components from the network device 180, the hard disk 110, or other sources.

In one embodiment, a digital certificate 127 is loaded from the network device 180. The digital certificate 127 contains a message that includes the expected hash value 195. In one embodiment, the digital certificate 127 is verified using the trusted authority signature or signature chain. The expected hash value 195 is transferred using the secure interface 140 and stored in the secure flash memory 100. In one embodiment, the secure interface 140 and the secure flash memory 100 is secured using cryptographic techniques described herein.

The I/O device 150 may be any device capable of transferring information to a local or a remote location. For example, the I/O device 150 may include a redundant array of inexpensive disks (RAID), a hard disk drive, a compact disk read-only-memory (CD-ROM) drive, a floppy disk drive, a tape drive, a network device (capable of interfacing to a local area network, for example). In one embodiment, the I/O device 150 is capable of reading and/or writing to a machine readable medium 151. The machine readable medium 151 may be a floppy disk, CD-ROM, or a tape cartridge, for example. In one embodiment, the machine readable medium 151 is a flash memory device. In another embodiment, the machine readable medium 151 is a carrier wave such that information is contained in a signal that is superimposed on the carrier wave. In one embodiment, the machine readable medium 151 contains instructions, which when executed by a machine, such as the processor 130, performs an embodiment of a method described herein.

Figure 2:
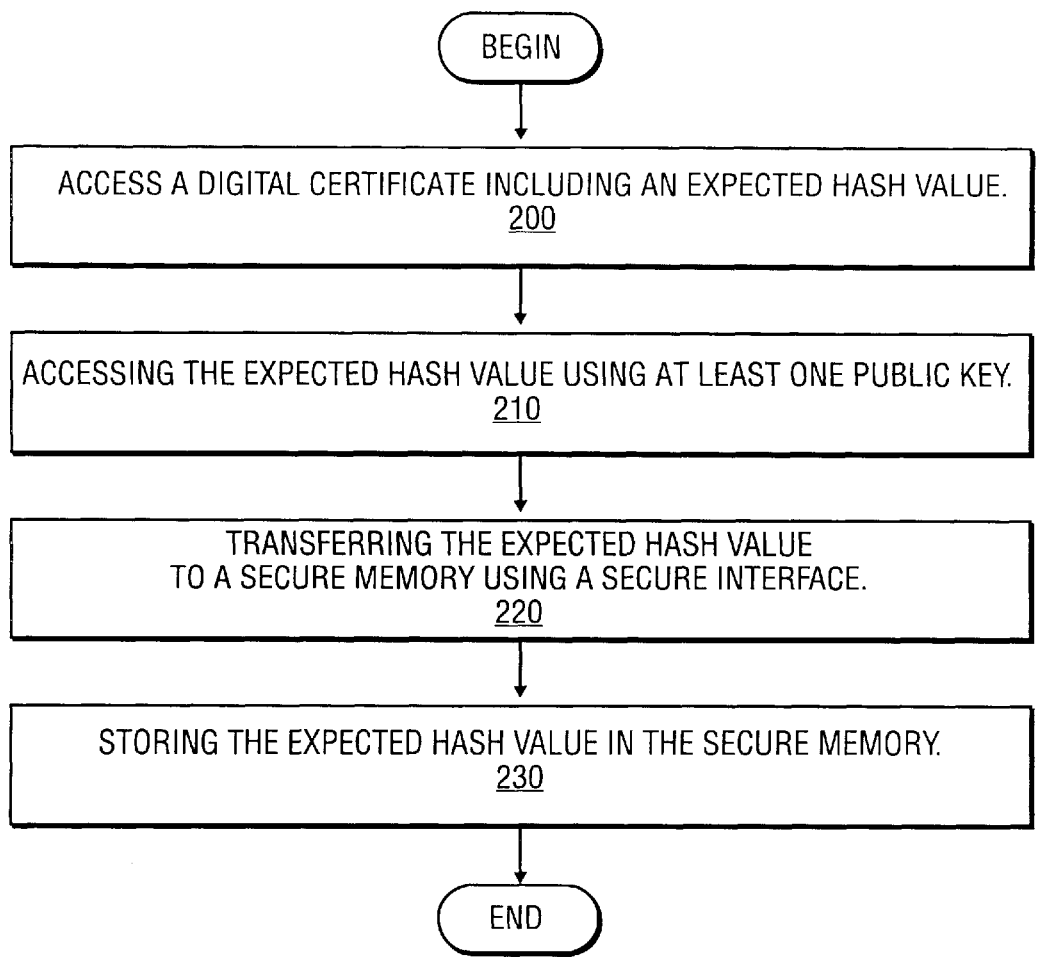
FIG. 2 illustrates one embodiment of a method of extracting an expected hash value.

FIG. 2 illustrates one embodiment of a method of extracting an expected hash value.

In step 200, a digital certificate including an expected hash value is accessed. The digital certificate may be accessed from any information source. For example, digital certificate may be accessed from a I/O device, such as a hard disk or floppy disk, or a network device, such as a network server.

In step 210, the expected hash value is accessed using a public key. For example, the digital certificate is signed using a Microsoft operating system signature (a private key). The expected hash value is extracted and verified using a Microsoft operating system public key.

Alternatively, the digital certificate includes other digital certificates to form a certificate chain. Authentication is performed by searching up the certificate chain to find a trusted authority public key. The trusted authority public key is used to extract the message from the subsequent certificate in the certificate chain. Verification is then performed for each signature down the certificate chain by using the public key in the message extracted from the prior certificate until the root message of the digital certificate is extracted. The root message includes the expected hash value.

In step 220, the expected hash value is transferred to a secure memory using a secure interface. In one embodiment, the secure interface is secured using cryptographic techniques, for example.

In step 230, the expected hash value is stored in a secure memory. For example, the secure memory may be a secure flash memory that contains the basic input output system (BIOS) code that includes the O/S loader 119. In one embodiment, the secure memory is secured using a digital signature. For example, the contents of the secure memory may be digitally signed using a BIOS manufacturer signature. Before being used, the BIOS is verified using the BIOS manufacturer's public key. Once verified, the BIOS can be trusted to update the hash value.

Figure 3:
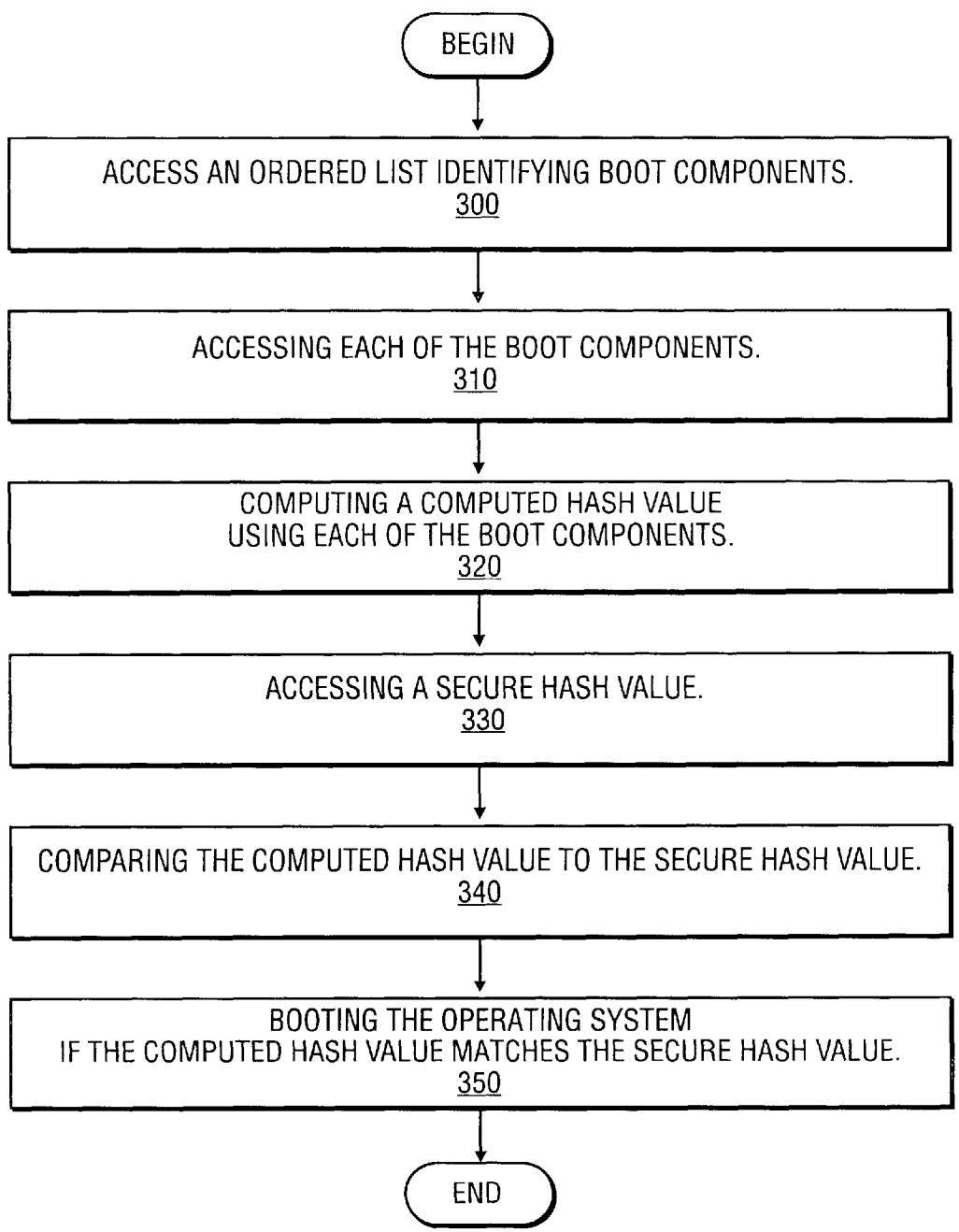
FIG. 3 illustrates one embodiment of a method of booting a computer system.

FIG. 3 illustrates one embodiment of a method of booting a computer system.

In step 300, an ordered list identifying the boot components is accessed. The ordered list may be accessed from any information source. For example, the ordered list may be accessed from a I/O device, such as a hard disk or floppy disk, or a network device, such as a network server.

In step 310, each of the boot components is accessed. The boot components may be accessed from any information source.

In step 320, a computed hash value is computed using each of the boot components. The ordered list is used to determine the order that the boot components are supplied to the hash function to generate the computed hash value.

In step 330, a secured hash value is accessed. In one embodiment, the secured hash value is stored in a secure memory, such as a secure flash memory. In one embodiment, the instructions for performing the steps of this method are stored in the secure flash memory. In one embodiment, the secure flash memory is secured using cryptographic techniques. Other methods of securing the secured hash value may be used.

In step 340, the computed hash value is compared against the secured hash value.

In step 350, the operating system is booted if the computed hash value matches the secured hash value. By checking the hash value computed from the boot components of an operating system installed on a computer with the secured hash value computed with the production boot components by the operating system vendor, the integrity of the boot components can be assured.

What is claimed is:

1. A method of booting an operating system having a plurality of boot components, comprising:

accessing an ordered list that specifies the order in which the plurality of boot components will be supplied to a hash function;

accessing the plurality of boot components in the order that the ordered list specifies;

computing a first hash value from the plurality of boot components;

accessing a second hash value from a secure flash memory;

comparing the first hash value to the second hash value; and booting the operating system if the first hash value matches the second hash value.

2. The method of claim 1 wherein the secure flash memory contains BIOS code, and further comprising transferring the second hash value to the secure flash memory from a digital certificate signed by the operating system by:

verifying the operating system's signature using the operating system's public key;

verifying the integrity of the BIOS code using the BIOS manufacturer's public key; and transferring the second hash value to the secure flash memory using the verified BIOS code.

3. The method of claim 1 wherein the ordered list further includes at least one pointer corresponding to the plurality of boot components, and the step of accessing the plurality of boot components further includes using the pointer to locate the corresponding boot components.

4. The method of claim 1 wherein the plurality of boot components [is] loaded from a local storage device by a loader, the loader being stored in are loaded from a local storage device by a loader, the loader being stored in the secure flash memory.

5. The method of claim 1 wherein the plurality of boot components are loaded over a network by a loader, the loader being stored in the secure flash memory.

6. A machine readable medium having stored thereon a set of instructions, which when executed by a machine performs the steps of:

accessing an ordered list that specifies the order in which a plurality of boot components will be supplied to a hash function;

accessing the plurality of boot components in the order that the ordered list specifies;

computing a first hash value from the plurality of boot components;

accessing a second hash value from a secure flash memory;

comparing the first hash value to the second hash value; and booting the operating system if the first hash value matches the second hash value.

7. The machine readable medium of claim 6 wherein the secure flash memory contains BIOS code, and wherein the machine readable medium further includes instructions, which when executed by a machine perform the steps of:

transferring the second hash value to the secure flash memory from a digital certificate signed by the operating system by:

verifying the operating system's signature using the operating system's public key;

verifying the integrity of the BIOS code using the BIOS manufacturer's public key; and transferring the second hash value to the secure flash memory using the verified BIOS code.

8. The machine readable medium of claim 6 wherein the ordered list further includes at least one pointer corresponding to the plurality of boot components, and the step of accessing the plurality of boot components further includes using the pointer to locate the corresponding boot components.

9. The machine readable medium of claim 6 wherein the plurality of boot components are loaded from a local storage device by a loader, the loader being stored in the secure flash memory.

10. The machine readable medium of claim 6 wherein the plurality of boot components are loaded from over a network by a loader, the loader being stored in the secure flash memory.

* * * * *

UNITED STATES PATENT AND TRADEMARK OFFICE
CERTIFICATE OF CORRECTION

PATENT NO. : 6,263,431 B1  Page 1 of 1
DATED : July 17, 2001
INVENTOR(S) : Lovelace et al.

It is certified that error appears in the above-identified patent and that said Letters Patent is hereby corrected as shown below:

<u>Title page,</u>
Item [73], Assignee, delete "Intle", insert -- Intel --.

Signed and Sealed this

Twenty-seventh Day of August, 2002

Attest:

JAMES E. ROGAN
Attesting Officer   Director of the United States Patent and Trademark Office